United States Patent

Mizobe

[11] Patent Number: 5,665,146
[45] Date of Patent: Sep. 9, 1997

[54] DEHUMIDIFIER

[76] Inventor: Kunitaka Mizobe, 2-31-38, Hoshikuma Jyonan-ku, Fukuoka-shi, Fukuoka, Japan

[21] Appl. No.: 581,607

[22] PCT Filed: Sep. 29, 1993

[86] PCT No.: PCT/JP93/01391

§ 371 Date: Jan. 3, 1996

§ 102(e) Date: Jan. 3, 1996

[87] PCT Pub. No.: WO95/01828

PCT Pub. Date: Jan. 19, 1995

[30] Foreign Application Priority Data

Jul. 3, 1993 [JP] Japan ............... 5-042238 U
Aug. 12, 1993 [JP] Japan ............... 5-232619

[51] Int. Cl.$^6$ ............... B01D 53/22; B01D 53/26
[52] U.S. Cl. ............... 96/7; 96/10; 96/13; 55/267
[58] Field of Search ............... 95/52; 96/4, 7, 96/8, 10, 12, 13; 55/267–269

[56] References Cited

U.S. PATENT DOCUMENTS

| | | | |
|---|---|---|---|
| 693,638 | 2/1902 | Breuer | 96/4 X |
| 2,452,066 | 10/1948 | Murphy | 96/4 X |
| 2,506,656 | 5/1950 | Wallach et al. | 95/52 |
| 3,229,023 | 1/1966 | Bolton et al. | 95/52 X |
| 3,369,343 | 2/1968 | Robb | 96/4 X |
| 4,331,460 | 5/1982 | Dillmann et al. | 55/485 |
| 5,417,743 | 5/1995 | Dauber | 96/13 |

FOREIGN PATENT DOCUMENTS

| | | | |
|---|---|---|---|
| 57-059618 | 4/1982 | Japan | 96/4 |
| 63-267416 | 11/1988 | Japan | 96/4 |
| 63-287530 | 11/1988 | Japan | 96/4 |
| 63-291623 | 11/1988 | Japan | 96/4 |
| 64-44631 | 2/1989 | Japan | . |
| 1-274824 | 11/1989 | Japan | 96/4 |
| 2-136808 | 5/1990 | Japan | . |
| 2-72194 | 6/1990 | Japan | . |
| 3-133581 | 6/1991 | Japan | . |
| 5-115735 | 5/1993 | Japan | 96/4 |
| 6-134244 | 5/1994 | Japan | 96/8 |
| 6-134245 | 5/1994 | Japan | 96/8 |
| 6-134246 | 5/1994 | Japan | 96/8 |

*Primary Examiner*—Robert Spitzer
*Attorney, Agent, or Firm*—Flynn, Thiel, Boutell & Tanis, P.C.

[57] ABSTRACT

A dehumidifier used to remove moisture from a sealed container by isolating a ventilation passage, which is provided in the sealed container, in a plurality of stages by water-vapor permeable waterproof films so that the interior of the ventilation passage has a gradient of density of vapor, and moves the vapor particles from the interior of the container toward the outside air. A structure provided with a cylindrical member fixed to a wall of a box and forming a ventilation passage allowing communication between the interior and exterior of the box, and a bottomed multiplex cylindrical ventilation member. The walls of the ventilation member are formed by first and second waterproof films having minute water-vapor permeable through holes. The bottomed cylindrical ventilation member being provided in the cylindrical member, whereby the ventilation passage is isolated in three stages from the inner portion of the container toward the outer portion thereof.

5 Claims, 9 Drawing Sheets

DEHUMIDIFIER

TECHNICAL FIELD

The present invention relates to a dehumidifier used to remove moisture from a moisture-proof, drip-proof container, and more particularly the invention is concerned in such a humidifier that houses electrical parts, etc. and is installed outdoors, basically without needing electric power or a chemical, to be replaced once it is saturated with moisture, or the like, on a long-term basis, while exerting a slow-acting dehumidifying effect.

BACKGROUND TECHNOLOGY

Conventional dehumidifiers known in the prior art include refrigerators equipped with compressors, refrigerant passages, etc., chemical desiccants, etc. although these apparatuses may work satisfactorily where they are installed appropriately for instruments, controlling, painting and other applicable uses, they have not been applied to such ordinary electric parts housing boxes that no fast-acting, absolute dehumidifying effect is required. With an aforementioned refrigerator, related capacity and cost do not meet at all. With a desiccant, a mass of the desiccant becomes considerably large for a long-term operation, regardless of the size of a housing box, etc., and in addition, maintenance may become laborious because of inspections for replacement timing and work.

With an electric parts housing box or the like, a simple moisture-proof, drip-proof structure is often incorporated, where a water-proof seal is installed at an opening/closing portion and a water-proof gland packing, etc. seals a bushing portion, instead of a dehumidifier using a refrigerator or a desiccant, and so on.

However, with such a moisture-proof, drip-proof structure as described above, once the concentration of moisture in the inside is higher than a limit, the structure may adversely affect dehumidifying, and even if the concentration of moisture in the atmosphere becomes lower than before, no dried state can be achieved, and in the extreme, dew may condense in the equipment, and if impurities contained in condensed dew make the equipment malfunction or break down the insulation, which is a fatal defect of a dehumidifier.

In these circumstances, an object of the present invention is to provide a novel dehumidifier free from the defects of a conventional dehumidifier known in the prior art, which can be used to dehumidify the interior of a hermetically sealed container or the like, with a moisture-proof, drip-proof structure, for a long time, basically without using electric power or a consumable chemical, while acting slowly using a simple, easy-operable construction.

Another object of the present invention is to offer such a dehumidifier as provided with low-cost auxiliary member materials that can support slow-acting dehumidifying, basically without using electric power or such a chemical or the like that must be replaced after the chemical is saturated with moisture.

DISCLOSURE OF THE INVENTION

A dehumidifier according to the invention is composed of a cylindrical body that is installed on a wall portion of a container and forms an air passage to communicate inner and outer portions of the container with each other, and a multi-layer, bottom-fitted cylindrical air-permeable body with a cylindrical wall which is made up, at least, of a water-proof film having moisture-permeable, penetrated microscopic holes, and by arranging the bottom-fitted cylindrical air-permeable body internally of the cylindrical body, the air passage is shielded in multiple stages, from the interior to the exterior of the container.

Thus, the air passage provided in the container can concentratedly activate breathing. Since the air passage is shielded with water-proof films in multiple stages, entry of water drops from the air passage into the container can be prevented effectively. The water-proof film is provided with penetrated microscopic holes that can pass moisture, so that the container can concentratedly breathe through the air passage. In this case, moisture particles move through the penetrated microscopic holes, from the atmosphere side, until the inner pressure of the container becomes equal to an outer pressure. If the concentration of moisture in the atmosphere is higher than the concentration of moisture in the container, at that time, moisture moves to the container side via penetrated microscopic holes, but as the concentration of moisture in the container gradually increases, moving speed of moisture to the container side also becomes slower.

Then the concentration of moisture in the container is higher than that of atmospheric moisture, moisture in the container moves to the outside. At that time, the moisture content in the atmosphere does not become higher even after exhausting internal moisture of the container, moving of moisture does not become slower. Such relationships as mentioned above occur between each chamber (shielded space) shielded in multiple stages, so that a gradient occurs between the moisture content on the innermost side and a moisture content in the atmosphere. The water-proof film is provided with moisture-permeable, penetrated microscopic holes, and in association with moisture and air permeability provided between each chamber, the inclination of a gradient of moisture concentration can be set in the form of a difference between heat capacities of chambers, that is, a difference of moisture contents, so that moisture is exhausted outwardly.

Practical details to adjust in such a manner as described above include how to select air or moisture permeability and a volumetric ratio between each chamber and a pressure difference between each chamber or between the interior and exterior of the container, and a pressure difference and a temperature difference.

Therefore, the dehumidifier according to the present invention can move moisture from the container to the outside by performing the aforementioned adjustment methods, while dehumidifying the interior of the container.

According to the present invention, in addition, vibration means that provide the above-mentioned water-proof film with an air vibration pressure in the dehumidifier as described above.

Thus, an air vibration pressure is applied to the surface of a water-proof film, so that diffusion of moisture is boosted to more positively drive moisture that is entering into penetrated microscopic holes of the water-proof film, from the container, to the atmosphere side(outside), thereby expediting to dehumidify the container interior.

In addition, in the dehumidifier of the present invention, an air-permeable heat insulation material is provided on a surface of at least a part of the air-permeable body, on the container side.

Thus, molecules of moisture approaching to and passing through the air-permeable heat insulation material exchanges heat energy thus far maintained by the moisture, with the air-permeable heat insulation material, so that the diffusion of the moisture is continued, and therefore, the amount of molecules of moisture passing from the container side to the atmosphere side(outside) becomes more than that of a case where only the water-proof film is used. Consequently, in addition to a dehumidifying effect by only a concentration gradient of moisture, a dehumidifying effect by preserving diffusion kinematic energy is superposed.

Furthermore, according to the present invention, the dehumidifier is provided with the air-permeable body that shields the air passage in multiple stages by arranging a plurality of the water-proof films having moisture-permeable penetrated microscopic holes so that the air passage inside the cylindrical body is interrupted, with spacings and the cylindrical body that is installed on the wall portion of the container and forms the air passage to communicate the interior and exterior of the container.

Hence, moisture moves toward the air passage and comes in direct contact with the water-proof film and passes through the film in a straight way, thereby accomplishing a dehumidifying effect. At that time, a dehumidifying area of this water-proof film cannot be made larger than an area of the above-mentioned bottom-fitted body with the same diameter of the air passage. However, the construction is simpler and handling is easier.

OPTIMUM STATES TO EMBODY THE INVENTION

To describe the present invention in more detail, the attached drawings are referred to.

Figure 1:
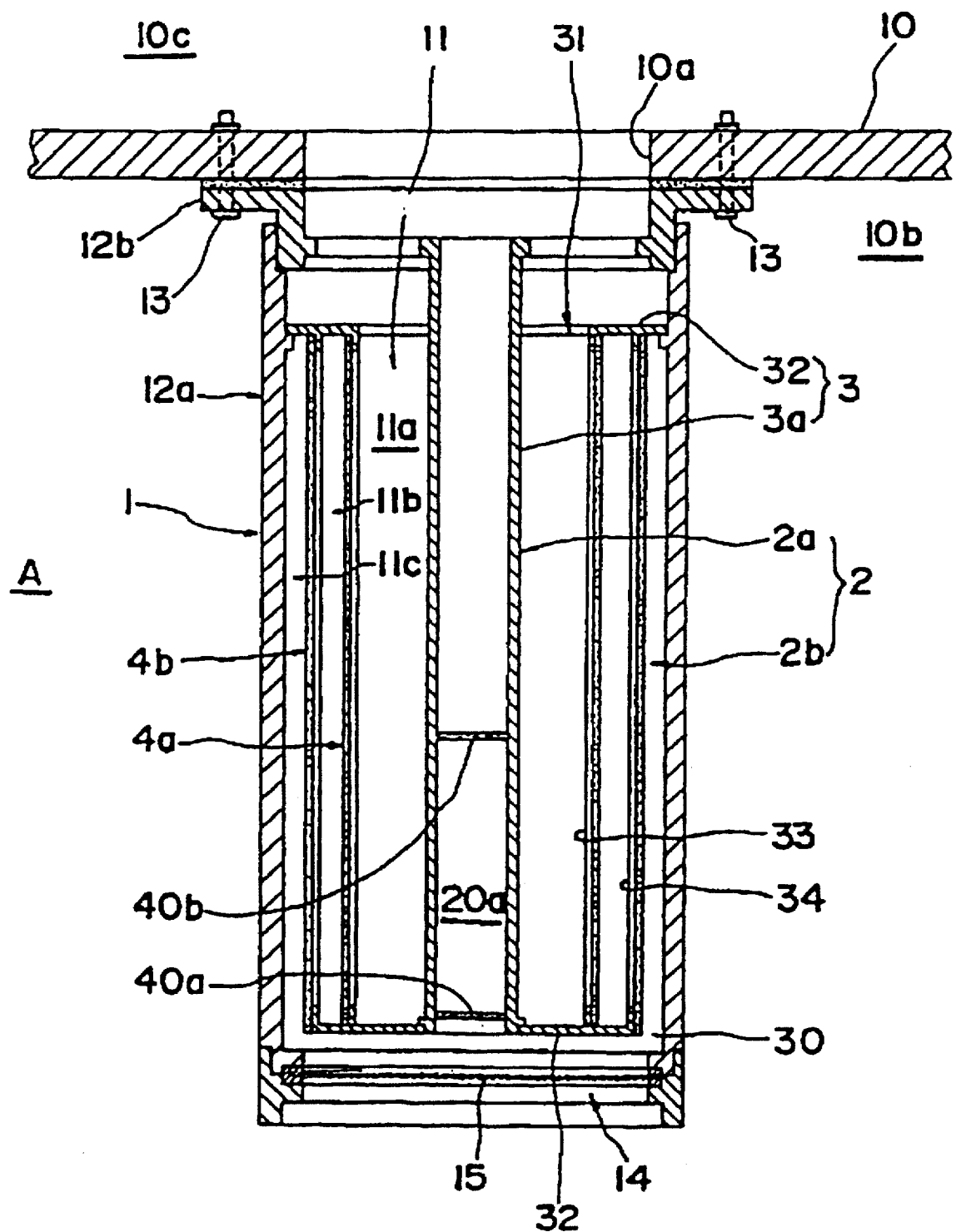
FIG. 1 is a section view showing the first embodiment of a dehumidifier according to the present invention.

FIG. 1 is a section view showing a dehumidifier A, as a first embodiment of the present invention; 1 and 2 in the figure represent a cylindrical casing and an air-permeable body, respectively.

The cylindrical casing 1 is to be installed at an installation hole 10a equipped on the lower surface side of a box 10 to be dehumidified. The casing is provided with a flange 12b on the one end side of a cylindrical body 12a that forms an air passage 11 and is composed so that the flange 12b side is fixed on the atmosphere side 10b of the box 10 by tightening screws 13. In addition, an opening on the one end side, that is, an outlet 14 of moisture is covered with a protection net 15 (to prevent dust and insects) to block entry of insects and foreign matters, on its entire surface.

The air-permeable body 2 allows the box 10 to breathe while blocking entry of water drops and also dehumidifying the interior of the box 10, and the body is provided with a frame 3 for the construction of an air suction portion 2a and an exhaust portion 2b.

In the frame 3, to compose the air suction portion 2a, an air suction cylinder 3a of a small diameter, to be installed detachably at a center portion of a flange 12b, is installed to extend toward a moisture outlet 14. To form an exhaust portion 2b, a partition plate 32 is provided at the top of the suction cylinder 3a, with a gap 30 to the cylindrical body 12a, and on the flange 12b side, another partition wall plate 32 in close contact with the cylindrical body 12a, with an opening 31 to the suction cylinder 3a, is equipped. If required, a draining valve may also be provided at the lower partition wall plate 32.

Figure 4:
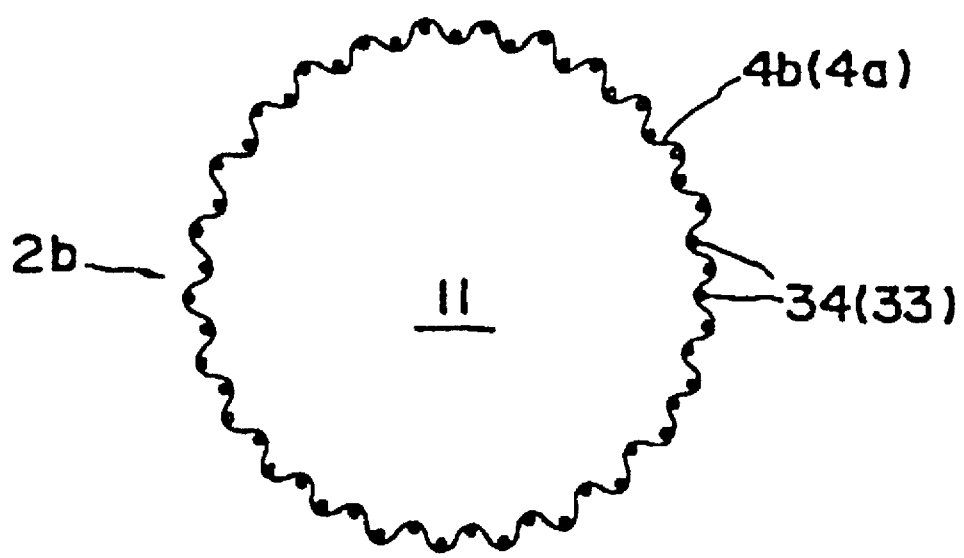
FIG. 4 is a section view showing another embodiment of an exhaust portion.

Moreover, double-wall mesh cylinders 33, 34 are installed, coaxially between the partition wall plates 32, 32. At that time, the use of mesh cylinders is not mandatory, but as shown in FIG. 4 instead, the water-proof film may also be supported in a continuously corrugated manner, without tension, compression and folding creases to increase the surface area of the water-proof film having permeable penetrated microscopic holes (moisture permeable film). In this case, the water-proof film may also be connected to the construction with a coupling system or a resin-fixing method using the mounting method in this embodiment, where an inactive resin fixes upper and lower parts. However, setting of the water-proof film should be carefully actuated so that no blocking, tensioning, compression or damages are created on penetrated microscopic holes in the water-proof film.

In the air suction cylinder 3a and mesh cylinders 33, 34, water-proof films are equipped, respectively, to compose the air suction portion 2a and exhaust portion 2b.

A first water-proof film 4a with a moisture permeability of 250 g/m×m×day and an air permeability of 18,000 sec/100 cc covers the mesh cylinder 33 on the smaller diameter side at the exhaust portion 2b, and at the mesh cylinder 34 on the larger diameter side, a second water-proof film 4b with a moisture permeability of 380 g/m×m×day and an air permeability of 23,000 sec/100 cc covers the entire surface, thereby composing a double-wall cylindrical air-permeable body.

As for the first and second water-proof films, a porous TEFLON resin film supplied by Nitto Denko Co., Ltd. with a tradename of BREATHLON was used.

At the air suction portion 2a, a third water-proof film 40a and a fourth water-proof film 40b are installed on the moisture outlet 14 side and the mounting hole 10a side of the cylindrical body 12a, respectively; materials in use of the third and fourth water-proof films are the same as those of the second water-proof film 4b and the first water-proof film 4a, respectively, in the exhaust portion.

Consequently, the air passage 11 in the cylindrical casing 1 is structured in a continuous state, by means of a first chamber 11a communicating with the box interior side 10c via the opening 31, a second chamber 11b partitioned by the first water-proof film 4a, second water-proof film 4b and partition wall plates 32, 32, and a third chamber 11c communicating to the atmosphere via a gap 30.

Next, the operation of the dehumidifier according to the present invention is described.

The embodiment, the dehumidifier A, is provided with an exhaust portion 2b composed of double water-proof films 4a, 4b and an air suction portion 2a having water-proof films 40a, 40b with rather small areas. However, the air passage rate of the exhaust portion 2b is much larger.

First, the box 10 can breathe without entry of water drops, by means of the second water-proof film 4b and third water-proof film 40a.

During a suction period of the box 10, air is inhaled until an internal pressure of the box 10 is in equilibrium with the atmosphere, and if a moisture concentration in the atmosphere is higher than that in the box, moisture then moves to the indoor side 10c via each water-proof film. At that time, since moisture permeabilities of water-proof films are smaller toward the box side, therefore moving rate of moisture turns very slow when the concentration of moisture on the box 10 side becomes higher.

Next, when a moisture concentration on the box 10 side is higher than that of the atmosphere, moisture on the indoor side moves to the atmosphere side 10b. At this time, in each of chambers 11a, 11b and 11c equipped in the air passage, the moisture permeability of a water-proof film closer to the atmosphere is larger than that of another water-proof film near the indoor side 10c. In addition, the concentration of moisture on the atmosphere side remains unchanged even if moisture is exhausted from indoors. Thus, the closer the chamber is to the atmosphere side, the lower the concentration of moisture is maintained, so that moving of moisture is boosted. If the temperature of the box 10 or humidifier A rises because of direct sunlight, for instance, the pressure of each chamber in the indoor side 10c or dehumidifier A increases. At that time, since air on the indoor side 10c communicates with the atmosphere side 10b, via a channel in the dehumidifier A. Therefore, air on the indoor side 10c is exhausted mainly through chambers 11a, 11b and 11c because of large surface areas, toward the atmosphere side 10b.

Then, if a moisture pressure on the indoor side 10c is higher than that on the atmosphere side 10b, moisture on the indoor side 10c is positively purged. On the contrary, when an atmospheric temperature decreases, air is inhaled from chambers 11a, 11b and 11c in the same manner. According to the present embodiment of this invention, chambers 11a, 11b and 11c are combined so that positive entry of moisture particles from the atmosphere can be easily prevented, by setting moisture concentrations of each chamber in a gradient on the exhaust side, for instance.

Originally, the chamber 11a is equipped on the exhaust side, and water-proof films 40a, 40b are set on the suction side. When a pressure on the indoor side 10c varies, moisture particles on the indoor side 10c are purged positively by making use of a temperature difference from the atmosphere and a concentration gradient set on the exhaust and suction sides; Fence, moisture particles in the chamber 11b and the chamber 20a equipped between water-proof films 40a, 40b are exchanged acceleratedly while enhancing a dehumidifying effect, according to the construction. In the construction, the permeability of the chamber 11b side is much larger than that of the chamber 20a side. Hence, permeabilities are different. As a result, a difference of heat capacity is created between both chambers, thereby also creating a temperature gradient in the dehumidifier A.

In addition, variations of a gradient of moisture concentrations, in association with the fluctuation of a pressure difference between the inside and outside of the casing, are greater on the chamber 11b side than on the chamber 20a side. These effects are utilized combinedly to increase a discharging rate of moisture particles from the indoor side 10c to the atmosphere side 10b, thus preventing the reduction of dehumidifying effect caused by temperature variations. As such, the dehumidifier A can dehumidify the interior of the box 10.

As described heretofore, the humidifier A of the present embodiment can dehumidify the interior of a box having a breathing function, on a long-term basis. At that time, a cylindrical exhaust portion plays a role of dehumidifying, so even if an opening area (diameter of an installation hole) of the box 10 is small, a large dehumidifying area is available, resulting in a greater dehumidifying effect. Moreover, the construction is simple and very easy to install and handle the dehumidifier.

Figure 2:
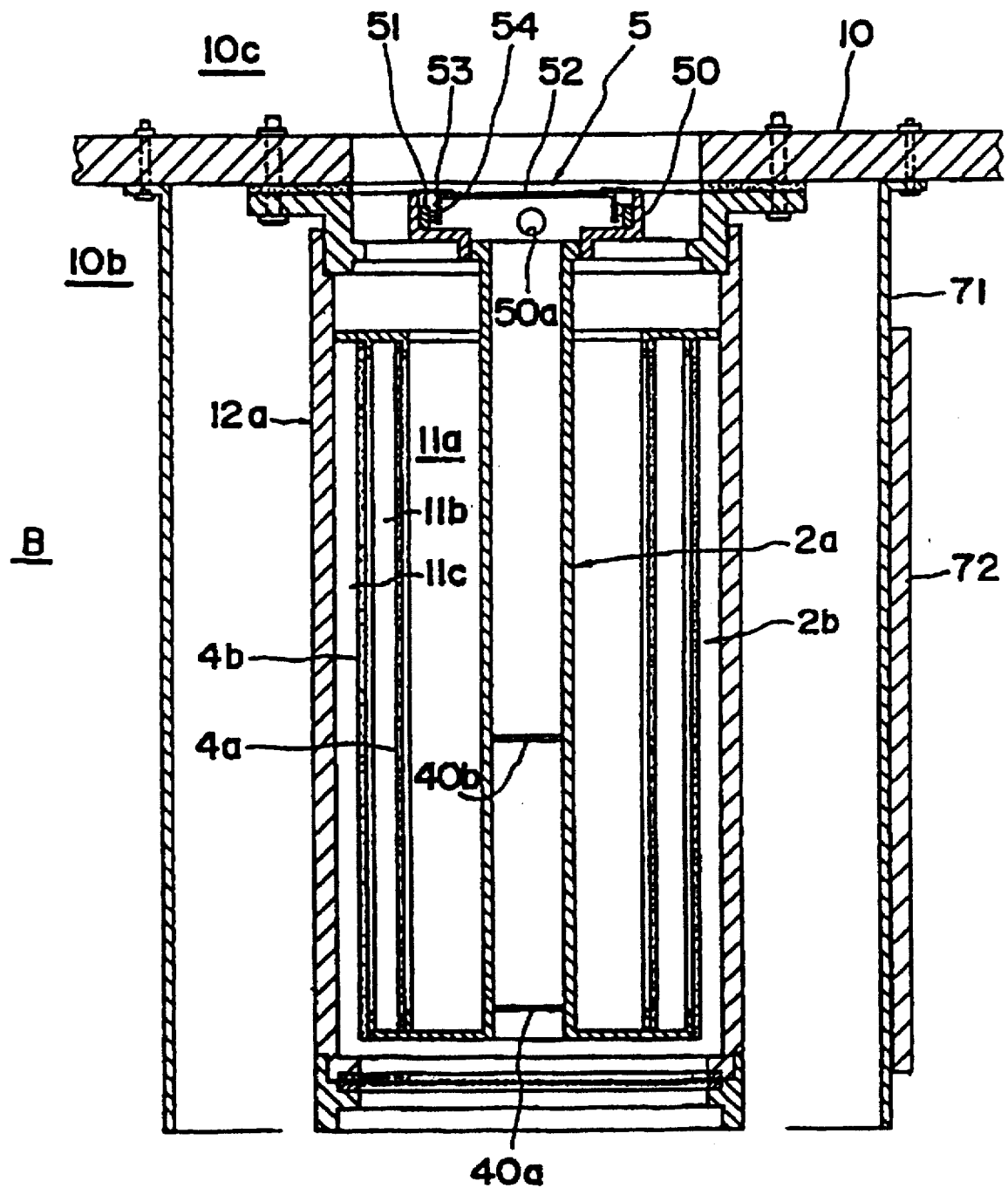
FIG. 2 is a section view of the second embodiment of the dehumidifier.

Now, the second embodiment of a dehumidifier according to the present invention is described referring to FIG. 2.

In the second embodiment, the same components as those in the aforementioned first embodiment are identified using the same numerals, and they will not be described in further detail.

The dehumidifier B of the second embodiment is novel in that vibration means 5 are provided on the indoor side.

In detail, the vibration means 5 are composed of a ring-like frame 50 screwed at the inlet of a cylindrical casing 1 and a circular magnet 51 fixed on the frame 50. In FIG. 2, numerals are used to represent components; 50a for an air passage hole, 71 for a sunlight shading cylinder, and 72 for a solar battery for power supply equipped in the sunlight shading cylinder. The sunlight shading cylinder 71 can also be extended from the cylindrical body at its lower part so that the shading cylinder 71 can also function as a raincover.

In addition, a vibration plate 52 is provided at one end of the frame 50, using a soft supporting member 53, while facing the air passage. Furthermore, a moving coil 54 is inserted in the cylindrical magnet 51 and fixed on the vibration plate 52, in that state. This moving coil 54 is connected to an amplifier (not illustrated) that generates air vibration pressure (in a high frequency).

With the dehumidifier B of this embodiment, diffusion of moisture is accelerated by applying an air vibration pressure from the inside of the chamber to a water-proof film, whenever required. In addition, since water-proof films 40a, 40b cause differences in probability for moisture particles to collide against penetrated microscopic holes, dehydrating is also boosted by a concentration gradient. Consequently, the dehydrator can expedite a dehydrating action because moisture entering into penetrated microscopic holes is driven actively to the atmosphere side 10b. At that time, an air vibration pressure is effective also to prevent clog of water-proof films.

Another possible formation with this embodiment is that a humidity sensor or temperature sensor is provided on the indoor side and the atmosphere side 10b, and when a moisture concentration indoors becomes higher than that on the atmosphere side, the vibration means are operated.

Figure 3:
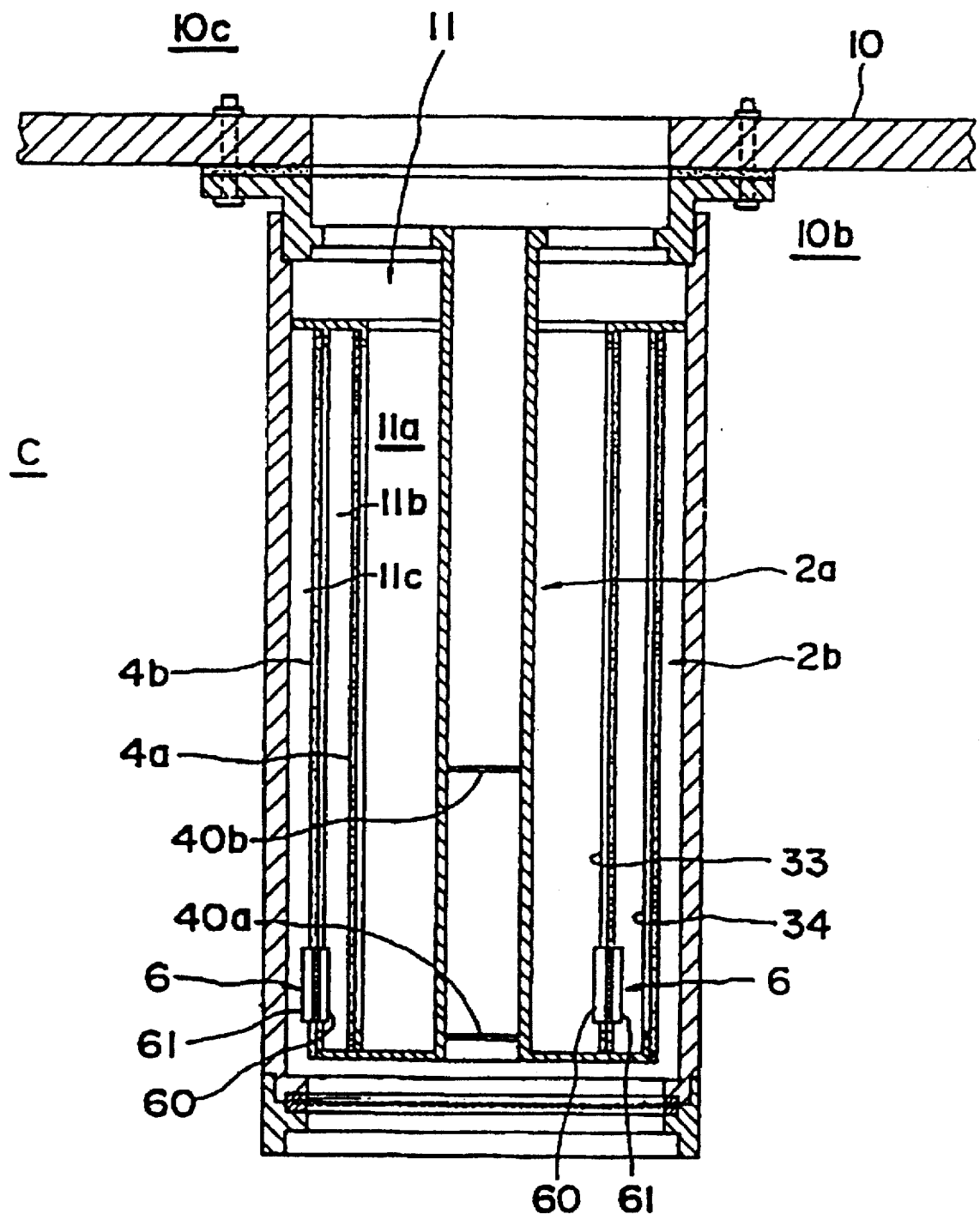
FIG. 3 is a section view of the third embodiment of the dehumidifier.

A third embodiment of the dehumidifier according to the present invention is explained, referring to FIG. 3.

Also with this embodiment, the same components as those of the foregoing example are identified with the same numerals, and no further detailed description is omitted herein.

The dehumidifier C of this embodiment is characterized in that an electronic cooling element 6 is provided in an air passage body 2.

With the electronic cooling element (Peltier device) 6, a cooling portion 60 is equipped facing the indoor side and a heating portion is installed toward the atmosphere side 10b, and a part of each film is cut away and mounted using a water-tight packing. Each electronic cooling element 6 is actuated to perform extremely weak cooling and heating functions and controlled so that the temperature of a chamber 11a on the box 10 side is lower than the temperature of a chamber 11c on the atmosphere side and there is a downward slope in the concentration of moisture in an air passage 11, toward the atmosphere side, and in addition, diffusion of moisture is accelerated to make moisture actively move toward the atmosphere side to expedite dehumidifying.

Also with this embodiment, another formation may also be incorporated, in which temperature sensors or humidity sensors are installed on the indoor side 10c and outside side 10b, and when the concentration of moisture indoors is higher than that of the atmosphere, the electronic cooling element is actuated.

Figure 5:
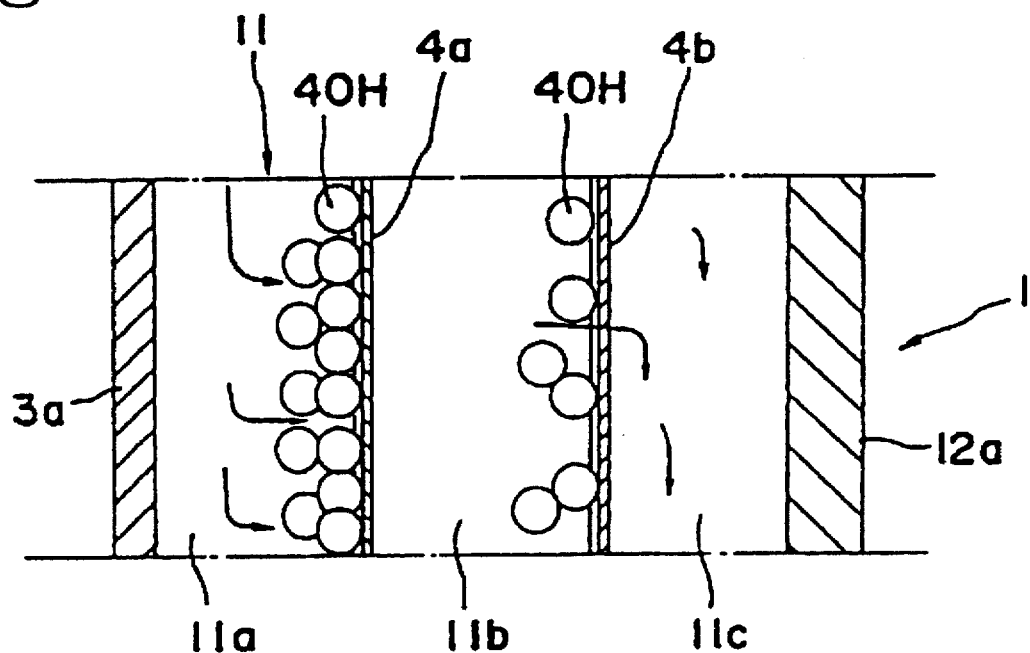
FIG. 5 is a section view of a fourth embodiment of the dehumidifier, by means of only a part of the exhaust portion.
Figure 6:
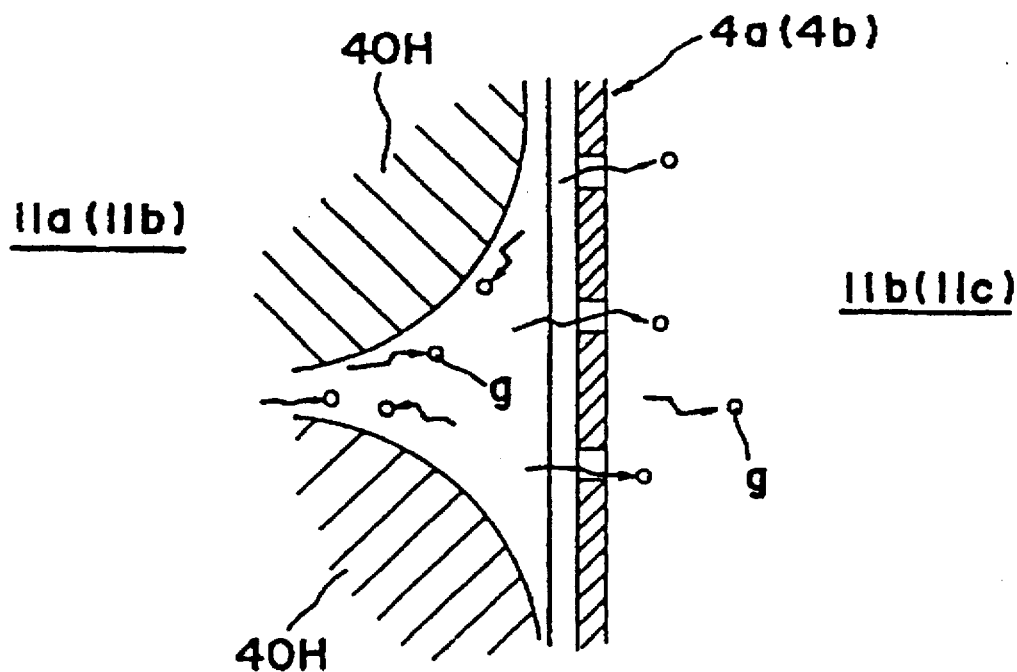
FIG. 6 is an enlarged descriptive view of surroundings of the water-proof film shown in FIG. 5.

Next, a fourth embodiment of the dehumidifier according to the present invention is described referring to FIGS. 5 and 6. Also with this embodiment, the same numerals are used to identify the same components as those in the foregoing embodiments, and no further detailed description is given here.

The dehumidifier of this embodiment is characterized in that air-permeable heat insulation materials 40H cover water-proof films 4a, 4b in an exhaust portion within an air passage body.

More explicitly, air-permeable heat insulation materials consist of foamed styrene balls which are stuck on the container-side surfaces (surfaces toward a suction cylinder 3a) of a first water-proof film 4a and second water-proof film 4b, in which densities of balls adhered are high and low, respectively.

In the present embodiment, each water-proof film is stuck with an air-permeable heat insulation material that is arranged to maintain a downward moisture concentration slope from the casing side to the atmosphere side, and the heat insulation effect of the water-proof film 4a is maintained higher than that of the water-proof film 4b. In addition, the arrangement or setting status of air-permeable heat insulation materials is adjusted for easy formation of a downward moisture concentration slope from the chamber 11a to the chamber 11c via the chamber 11b, thus a temperature gradient in the air-permeable heat insulation materials is formed. However, these air-permeable heat insulation materials are aimed at only maintaining diffusion motion of moisture particles accommodated thus far, and the materials are set so that the particles are diffused outwardly, in consideration of a heat capacity of each chamber, whose differences are created by differences in the concentration of moisture in each chamber.

Therefore, moisture particles g in each chamber take such a state as shown in FIG. 6 where heat energy is preserved, thereby maintaining diffusion motion, and a mass of the particles that pass a water-proof film 4a (4b) becomes greater. To the contrary in this case, moisture particles g near the outwardly facing water-proof film 4a (4b) are not given such an effect as mentioned above, immediately before the water-proof film. Consequently, their diffusion motion energy for only passing the water-proof film becomes less than the same in the previous chamber, and most moisture particles g are blocked by this water-proof film to prevent counterflowing.

Figure 7:
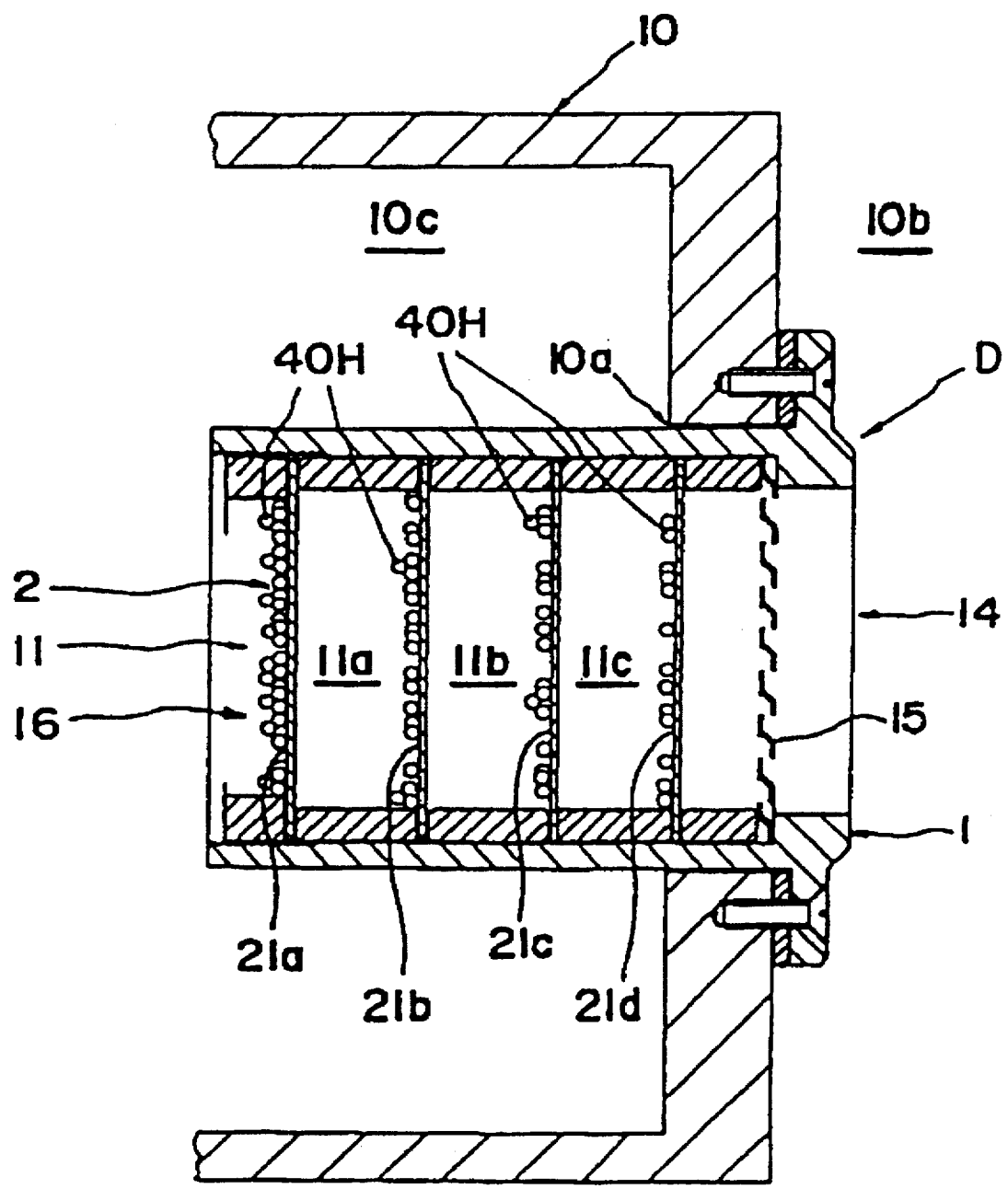
FIG. 7 is a section view of a fifth embodiment of the dehumidifier.

Next, a fifth embodiment of the dehumidifier according to the present invention is explained, referring to FIG. 7.

Components numerals in this embodiment are also defined in the same principles as described above, using the same numbers, and no further description is given in the following.

The dehumidifier D of this embodiment is provided with a first water-proof film 21a, second water-proof film 21b, third water-proof film 21c and fourth water-proof film 21d, orthogonally to an air passage 11 composed by a cylindrical casing 1, from an inlet 16 side to an outlet 14 side, where diameters of penetrated microscopic holes are small to large in this order. In addition, each aforementioned water-proof film is covered with an air-permeable heat insulation material 40H, and densities of these materials are small to large in the order as mentioned above.

An operation and effect in this case are the same as those of the above-mentioned fourth embodiment. Therefore, further description of operation and effect is omitted here.

Figure 8:
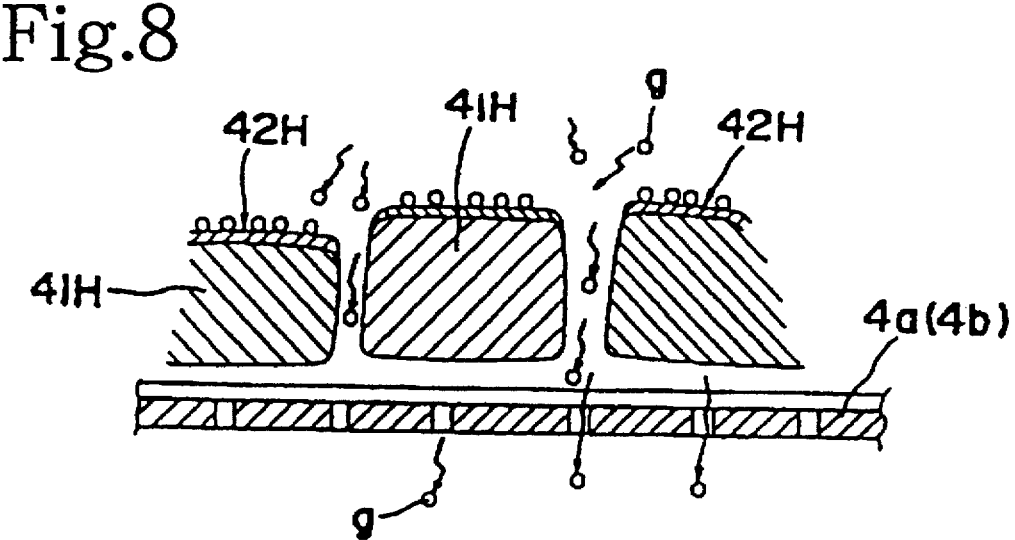
FIG. 8 is a section view of a sixth embodiment of the dehumidifier, by means of only a part of the exhaust portion.

Now, a sixth embodiment of the dehumidifier according to the present invention is explained with a reference of FIG. 8.

Component numerals of this embodiment are not described any more, because the same numbers are used for the same components as in the aforementioned embodiments.

According to experiments and various kinds of know-how and experience related to the present invention, it has been revealed that an air-permeable heat insulation material, once treated to prevent storage of electric charges, the material can suppress stagnation of moisture particles.

When moisture particles pass the surface of an air-permeable heat insulation material, passing speed is very low over the entire surface of a layer of the air-permeable heat insulation material, including other air-passage surfaces than those of the air-permeable heat insulation material, i.e. air-permeable passages of the air-permeable heat insulation material. If a surface is charged with electricity, moisture particles may easily be adsorbed on the surface. Consequently, the air-permeable heat insulation material can easily seize moisture particles, but permeability of the heat insulation material may become smaller after capturing moisture particles, than before.

Therefore, the performance of the air-permeable heat insulation material can be improved by, for instance, composing only a layer on the capture side (casing side) of the air-permeable heat insulation material or the surface layer on the opposite side of the water-proof film in the air-permeable heat insulation material, with such a material as easily chargeable, and then by composing the lower side of the layer (moisture permeable film side) with another material of a high permeability.

Water-proof films 4a (4b) of the present embodiment are novel in that a non-chargeable, air-permeable heat insulation material 41H is covered on the surface on the casing side, and in addition, an extremely thin chargeable, air-permeable heat insulation material 42H is stuck on the casing side surface of the heat insulation material 41H.

As a result, although a limited amount of moisture particles g is captured on the chargeable, air-permeable heat insulation material 42H, the other moisture particles g receive a considerable amount of diffusion energy from non-chargeable, air-permeable heat insulation material 41H whose mass is greater than that of the chargeable, air-permeable heat insulation material 42H. Consequently, a moisture passage rate of the water-proof film increases.

In addition, a chamber composed by covering a water-proof film with a non-chargeable, air-permeable heat insulation material can also be provided on the casing side of an air passage body forming a dehumidifying chamber in several stages using the water-proof film in the above-mentioned composition, as a chamber to collect moisture particles, or on the atmosphere side as a diffusion chamber.

Embodiments of the present invention has been described, but a practical composition of the present invention shall not be limited only to the above-described embodiments, but even a design modification or the like within the scope of the invention may also be covered by the spirit of this invention.

For instance, though it was described with an embodiment that water-proof films cover the entire surfaces of the mesh-like cylinders 33, 34, but while not limited only to this description, a covering range of water-proof films can be selected freely and a range can be set in various manners according to numerous factors such as the volumetric ratio of each chamber, permeability of a water-proof film, difference between permeabilities and particulars of the atmosphere. At that time, a portion of the mesh-like cylinder, not covered with a water-proof film, can be constructed in a blind plate form, and moreover, the portion can also be formed using a heat isolation material or a heat insulation material or the like.

A heat isolation wall or heat insulation wall may also be provided in the inside or outside of a cylindrical casing 1, to increase a moisture concentration gradient. Or, a temperature or humidity sensor may also be installed in there, and by using the sensor, a moving direction of moisture particles between each chamber can be controlled and finely adjusted.

Figure 9:
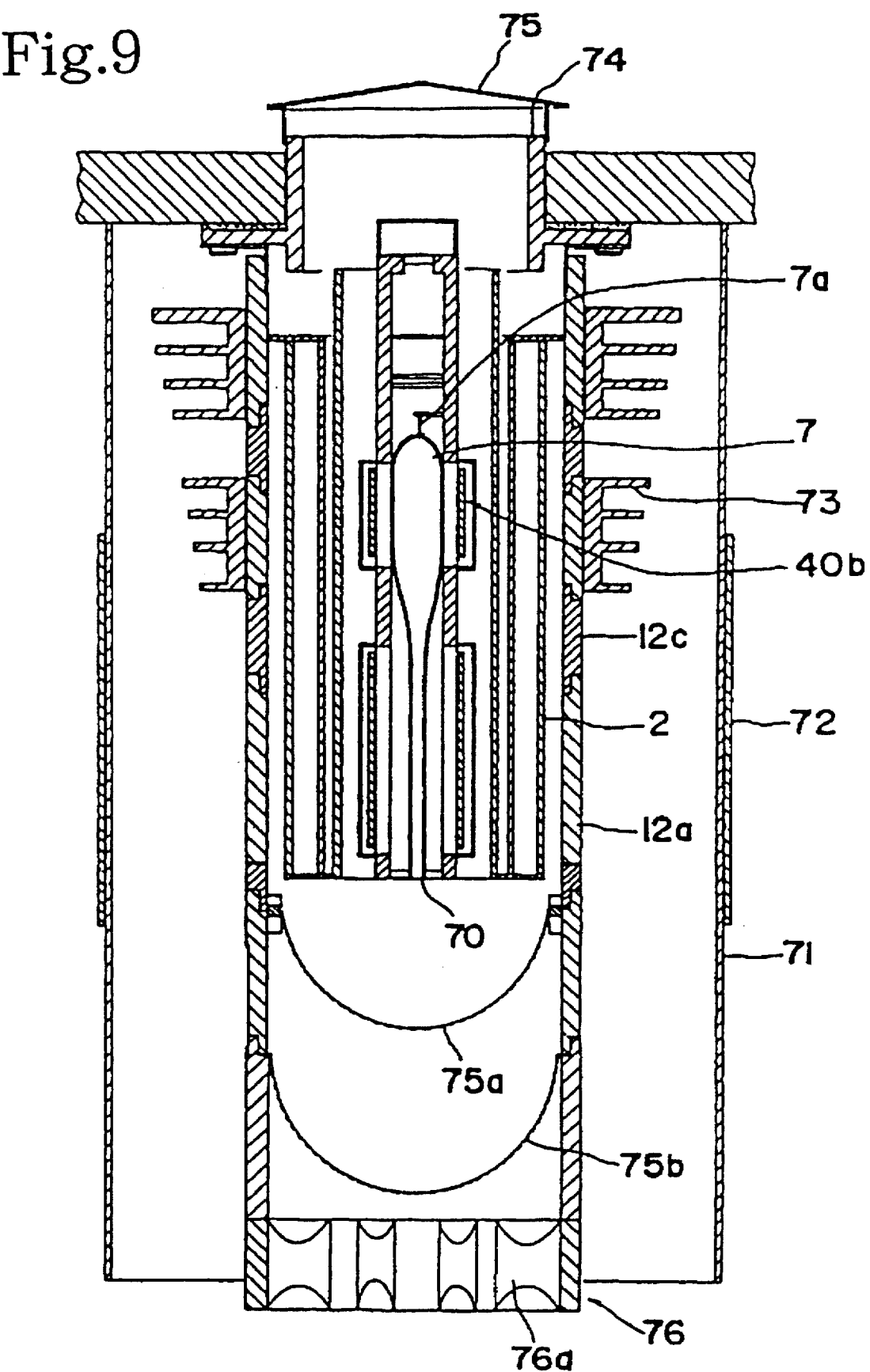
FIG. 9 is a section view showing another embodiment of the dehumidifier.

A fan may also be equipped inside or outside of the cylindrical casing 1. It is also possible to connect the fan to the aforementioned humidity or temperature sensor, or photovoltaic battery, timer or the like, thereby operating the dehumidifier intermittently or in a revolution frequency control mode, and so on. At that time, the type of the fan can be freely selected, including a propeller type and a Silocco type.

Where an ambient temperature changes largely because of weather conditions at the installation site of a dehumidifier or heat generated by electric devices in a casing, a balloon-like accumulator 7 may be provided in a suction portion 2a as shown in FIG. 9. At this time, an air passage port 70 of the accumulator 7 is installed toward the atmosphere side so that the accumulator 7 can catch a breathing air volume created by prompt heating and cooling of the box, thus damping pressure variations inside the box. It is also possible at that time that a water-proof film 40b provided on a suction side wall can be closed when the accumulator 7 expands or contracts, for instance. In FIG. 9, the numeral 7a represents a supporting member (a spring or string) that supports the accumulator at a predetermined place.

Or, a trap may also be provided at the lower end of the suction portion 2a, instead of the above-mentioned accumulator 7. Where a siphon type is incorporated, silicon oil, for instance, is charged in the interior. At that time, an orifice or orifices may be provided on the connection side of the suction portion 2a or on the opening side of the atmosphere. The diameter of a curved tube may preferably be so large that no oil can enter into the suction portion 2a side even if an air pressure on the box side changes rapidly. Furthermore, sealing plugs may be used at both ends to prevent leakage of oil during transportation.

With the embodiment 3, a cooling/heating semiconductor element was used for heating function. However, heating function of a regulator or the like may also be utilized, for instance, and such a heat radiation panel may be installed on the high temperature side in a temperature gradient.

The material of a cylindrical body may consist of a plurality of materials having different thermal conductivities, to enhance creation of a temperature gradient, or heat isolation paints with different thermal conductivities may also be incorporated, wherever needed. For instance, materials of a cylindrical body 12a and a suction cylinder 3a may be made different from each other, in a composition.

A sunlight shade maybe provided outside a cylindrical casing 1. At that time, a heat isolation material may be used in a connection portion between the sunlight shade and the casing 1. Another possible composition is that a photovoltaic battery is provided on the outer periphery of the sunlight shade or the cylindrical casing, to expedite dehumidifying action via a fan, a heat generating semiconductor element, a cooling/heating element or air vibration means. In this case, if the temperature of a box 10 increases very rapidly because of intense sunlight, for instance, exhausting of moisture from indoors 10c may be adjusted in normal proportion to the radiation degree of sunlight, or a dehumidifying effect may be accelerated mechanically for a limited time period, using a timer.

Another possible composition is that a further water-proof film is provided inside of a partition wall plate 32 or a protection net 15 or on the opening side of the indoor side 10c, thereby allowing to change the degree of moisture concentration gradient between the suction and exhaust sides, depending on an installation area.

In the composition shown in FIG. 9, where a ring-like heat insulation material 12c is installed in the cylindrical casing 1 to interrupt heat conduction from the box 10 to the atmosphere side opening portion of the cylindrical casing 1, it is also possible to incorporate materials having different thermal capacities at locations in different distances from the box 10. At that time, a similar construction maybe employed for the inner suction cylinder. Materials can be combined freely at this time. Where the temperature of the box 10 increases significantly, the temperature rise of the equipment can also be suppressed by connecting a heat radiation plate 73 to the cylindrical body 12a, or a dehumidifying effect can be made stationarily actuatable by suppressing a temperature gradient and overheating of the equipment by setting suitable heat radiation plates at materials having different thermal conductivities.

The most preferable location of a mounting portion flange 12b on the box 10 is a bottom portion, in general. At that time, a water drop entry prevention weir 74 may be provided to block entry of water drops, condensed indoors 10c, into the dehumidifier, by constructing the weir so that it protrudes from the mounting hole 10a toward indoors 10c of the box 10.

Regarding mounting methods of the aforementioned flange, a screw-fixing type has been based on, but another possible system is that a fitting special for mounting is provided outside the box 10, and the fitting is screwed with an external fitting for fixing. Besides the fitting equipped externally of the box, the flange 12b may also be sandwiched into the box 10. In these cases or the like, a squeeze packing may also be introduced wherever required.

Another possible modification is that insulation materials or conductive materials can be selectively used for the cylindrical body 12a or flange 12b or suction cylinder 3a or mesh cylinders 33, 34 and so on, depending on the type of equipment to be mounted on the box 10, so that an adverse effect from the equipment is suppressed by taking into account a potential gradient (a gradient in a charged state) caused by a moisture concentration difference, to be possibly introduced in addition to a concentration gradient. Moreover, a corrugated creep surface, aimed at insulating, may also be used in the outside and inside of the equipment mounting portion casing side attachment portion.

It is also possible in an identical water-proof film to use an annular (coil-like), corrosion-resistant, conductive material in, for instance, a vertical type (the water-proof film is a bottom-fitted type). Also, a horizontal type (the water-proof film is orthogonal to an air passage), coaxial conducting body may also be set.

Setting of the conductive body in each chamber may be freely actuated according to a moisture concentration gradient or heat capacity gradient.

Otherwise, both conductive bodies can be interconnected electrically at chambers on the outside and inside. If a significant difference occurs at each chamber on the outside and inside in a moisture concentration gradient or a heat capacity gradient, in a local installation site, or in such an area that a significant temperature difference occurs in a day, an electric resistance may be placed at the connection portion. Or, a value of the electric resistance can be adjusted interlockedly with a temperature sensor or a humidity sensor or the like, thereby more effectively suppressing electric polarization caused by a temperature gradient.

Concerning the adjustment of an electrostatically charged state of moisture particles, there are possible means as follows. A conductive body is enclosed with an insulation material to prevent soiling of a chamber space or a water-proof film by the conductive body, and only an electrostatically charged state is adjusted, in a high-frequency coil or a loop coil, for instance, such a coil is set on the inside and outside of a tube wall, chamber composition unit between water-proof films, or on one side thereof, thereby preventing pollution of the chamber space or water-proof film by the conductive body. Also, variations of a moisture concentration gradient are maintained steadily for the purpose of adjusting an electrostatically charged state on the chamber wall or unit wall or chamber space.

This is because a charged state is created in association with a flow of a non-conductive fluid in a tube, though a charged potential will be very low, therefore, at least two different types of materials come in contact with each other on the tube wall, on the boundary surface of which there is an uneven distribution of positive and negative charges. In addition, these two materials move relatively to decompose charges of different polarities, from each other.

Thus, a layer of charged particles is created as an electric double layer, so that an electrostatic, extremely weak current is generated, and a very low current flows on a chamber creep surface along the tube wall. This leads directly to soiling of a chamber interior by an electrolytic content in moisture, that may trigger performance deterioration. Therefore, such charges as described above must be balanced as far as possible, particularly in an electric non-conductive body.

Hence, setting of the aforementioned coil may possibly be needed where a significant temperature difference is created between chambers or there is a moisture concentration gradient.

However, the density of a fluid is extremely small and the velocity of the fluid is very low with a short length of a flow passage. Therefore, soiling may possibly be not problematic at all, in some cases. However, the above-mentioned method is effective means to prevent soiling at a moisture-permeable film holding portion or moisture-permeable film connection attachment portion.

Soiling of these portions occur because dielectric constants of chambers vary when a base fabric or air-permeable heat insulation material is charged into a chamber. The aforementioned method is intended to adjust variations of electrostatic capacitances of chambers or intentionally modify capacities.

Therefore, it is possible to set an electrostatic capacity gradient or potential gradient between each chamber for a coil or the like to be set in a chamber, including the conductive body as described above, in considering the aforementioned electrostatic induction. One end of a coil above can be grounded. In addition, where a plurality of coils are equipped internally, terminals of the coils may be connected with each other directly or via a resistance.

This is secondary, supplementary means to be added to basic setting of a moisture-permeable film itself, for a moisture concentration gradient.

The dehumidifier is installed preferably at a bottom portion of a box as shown in an embodiment, because moisture may stand often at a bottom place. However, it may also be installed on the side wall or at the top of a box. However, in such a case, a rain cover must be set, because soiling of a moisture-permeable film or a moisture-permeable, water-proof film may be accelerated at such a location, and in the extreme, an exhaust channel may block.

Where a dehumidifier is installed on a box side wall or at the top, setting of a temperature gradient should be modified. For instance, setting conditions of a temperature gradient or moisture concentration gradient may be modified between sunny and shadow sides.

A water drop cover 75 may also be provided to prevent entry of dew condensed in a device of the box 10, into the dehumidifier. This is intended to provide safety means for an emergency that air-tightness is broken on the box side, because the dehumidifier is installed generally in a box having a water-proof, air-tight structure. The means are aimed at continuously maintaining the air-tightness where water drops standing in the box 10 can no longer satisfactorily block an air passage of a water-proof film as a result of a temperature rise.

According to various experiments carried out by the inventor, it was confirmed that convection occurred in a chamber. Means applicable to maintain such convection stationary include that, for instance, a heat insulation wall consisting of a heat insulation material is equipped on an inner cylinder wall of the suction cylinder 2a or on the surface of a water-proof film of the first chamber 11a, or the like, or otherwise, a roll-cell-like, or hexagonal-cell-like, or fin-like guide cylinder may also be provided.

Or, convection phenomena in a chamber may be boosted by changing all or part of the thickness of an air-permeable heat insulation material of identical or different water-proof films, thus providing a difference in a dehydrating effect in related locations.

As for an air-permeable heat insulation material, it is preferable to select such a material as low in hydrophobicity, water repellency and water absorption, and high in a heat insulation property. With a water-proof film, it is also possible to omit setting of an air-permeable heat insulation material in a chamber space by using a moisture-permeable film reinforcing fabric of an air-permeable heat insulation material with the same thickness, or making the thickness greater only at a necessary portion. Thus, it is also possible to adjust convection phenomena in a chamber.

With a vertical type, in a dehumidifying module (air passage body) of the same diameter, moisture-permeable films with different moisture or air permeabilities may be used on the box side and non-box side (outside), and in consideration of convection phenomena that may occur between each chamber, a moisture concentration gradient, temperature gradient and heat capacity gradient between each chamber may be created by using, for instance, a moisture-permeable film with a low air permeability and a high moisture permeability in an upper portion and a moisture-permeable film with a high air permeability and a high moisture permeability in a lower portion.

Also with a horizontal type, in the same manner as described above, the arrangement of moisture-permeable films may be adjusted in considering convection phenomena in each chamber by discriminating the chamber side-wall side and center axis side.

As shown in FIG. 9, the protection net can be separated into a dust-proof net 75a and an insect-proof net 75b and each net may be formed downwardly convex so that, even if a water-drop may adhere, it flows down and is quickly removed (through falling or evaporating). By separately locating both nets, air permeability may become higher and drying can be finished more quickly.

Figure 10:
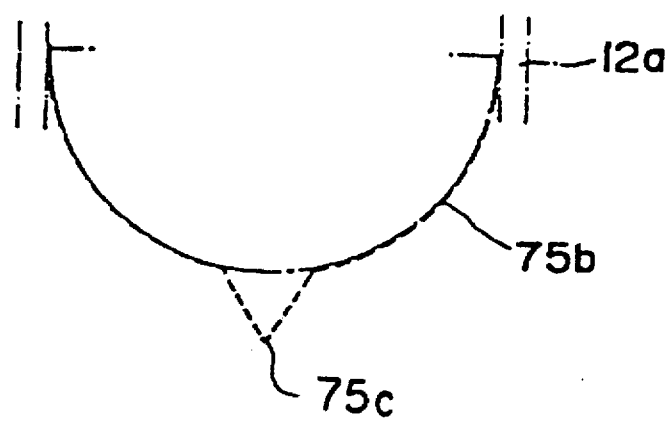
FIG. 10 is a section view showing a second embodiment of the insect-proof net shown in FIG. 9.
Figure 11:
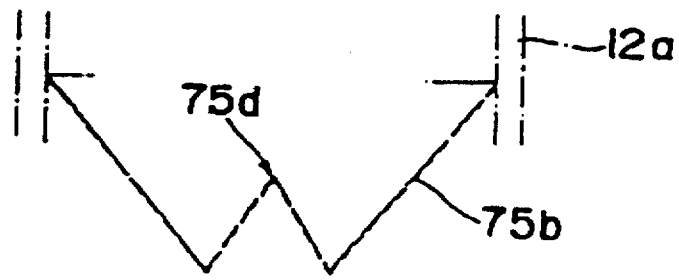
FIG. 11 is a section view showing a third embodiment of the insect-proof net shown in FIG. 9.

At this time, as shown in FIG. 10, a downward elevation portion 75c may be provided at a center portion, or as shown in FIG. 11, an upward elevation portion 75d may be provided at a center portion.

The insect-proof net 75b may preferably be made of a stainless steel net or resin fabric net treated for mold-proof.

Figure 12:
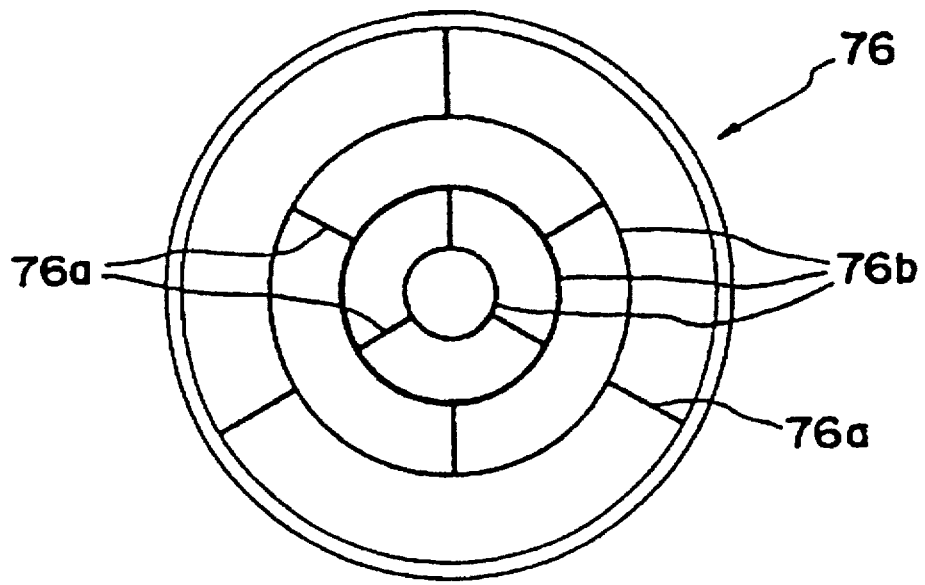
FIG. 12 is a plan view showing the wind-shield net of FIG. 9.
Figure 13:
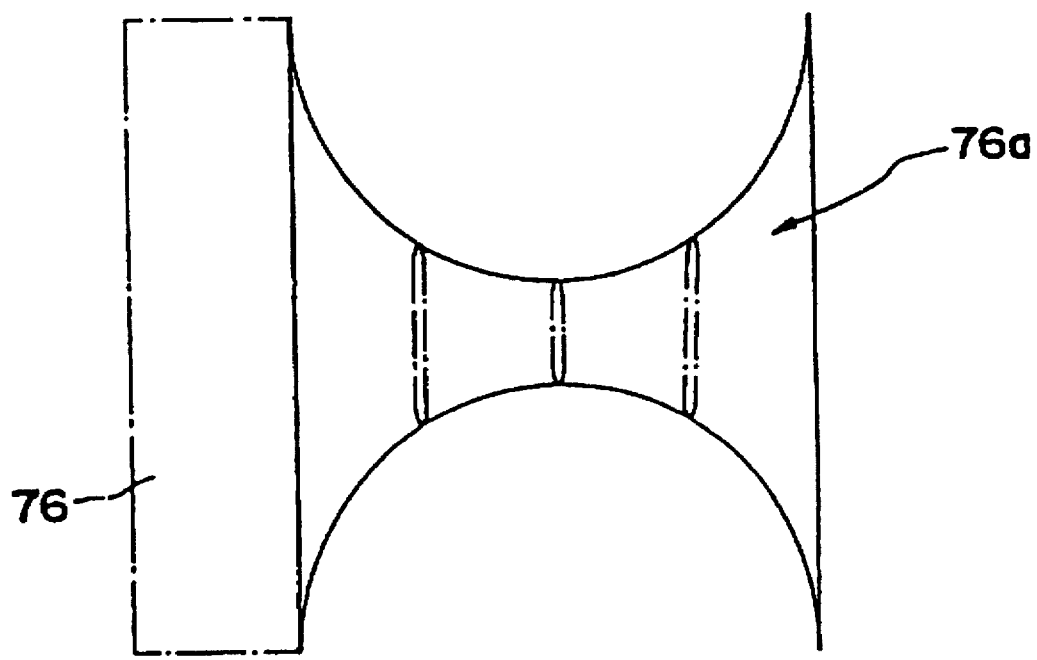
FIG. 13 is a partly enlarged descriptive view of the wind-shield net.

Also, a wind-shield net 76 may be provided at a bottom end of a cylindrical body. In this wind-shield net 76, coaxial cylinders 76b for rectification are supported by supporting frames 76a as shown in FIGS. 9 and 12, and locations of these supporting frames 76a are shifted relatively from each other to make air permeability as high as possible, and they are shaped in a combination of curves (see FIG. 13) to prevent standing of water drops. In addition, their cross sections are shaped with acute angles at ends of curves (see dotted lines in FIG. 13).

A dehumidifier can also be installed in a gear case, container or the like, not limited only to an electric device.

The dehumidifier can be mounted via a trap onto a gear case, etc.

To accelerate dehumidifying, moisture-pressure adjusting means using capillary tubes can apply. At this time, ratios of cross sections of capillary tubes communicated between each chamber are adjusted to have stationary moisture concentration gradients between each chamber, as supplementary means. For instance, in such a region that an atmosphere humidity may suddenly vary, a humidity on the capturing chamber side using capillary tubes is maintained lower than a critical rusting humidity, for example, to maintain an appropriate gradient of moisture concentration, thereby preventing fast inflow of moisture from the atmosphere side.

Another possible provision may be that capillary tubes communicating from a chamber closest to the atmosphere side, to the atmosphere are provided, and at such a location that rainwater falls on the atmosphere side, a water catching container is provided in which the other ends of the capillary tubes are set to store rainwater. In this case, capillary tubes absorb water and evaporate it in the chamber making a humidity in the chamber closest to the atmosphere side, higher than humidities in other chambers. Therefore, atmospheric air entering into the chamber is damped, thereby reducing entering power of the air, so that moisture particles can no longer enter from the atmosphere side.

POSSIBLE APPLICATIONS IN THE INDUSTRY

The dehumidifier according to the present invention, as described in the above, can be effectively used to dehumidify the interior of various control boxes, gear cases, containers, waveguides, microwave antenna domes or the like that house electric devices and apparatuses and need not be fast dehumidified, and in particular, the dehumidifier is suitable for dehumidifying a hermetically sealed container that will not be inspected for a long time.

What is claimed is:

1. A dehumidifier mounted on a wall portion of a container, comprising a cylindrical body forming an air passage to communicate the interior and exterior of said container with each other; and a plurality of bottom-fitted cylindrical air passage bodies where at least a part of a cylinder wall thereof comprises a water-proof film having moisture permeable, penetrated microscopic holes, in which said bottom-fitted cylindrical air passage bodies are arranged inside said cylindrical body, thereby shielding said air passage in a plurality of stages from the interior to the exterior of the container.

2. The dehumidifier of claim 1, further comprising vibration means for providing said water-proof film with air vibration pressure.

3. The dehumidifier of claim 1, further comprising a semiconductor element at least having a heating effect, provided in said air passage.

4. The dehumidifier of claim 1, further comprising an air-permeable heat insulation material on at least a part of said air passage body on a surface of the container.

5. A dehumidifier comprising a cylindrical body that is mounted on a wall of a container and forms an air passage communicating the interior of said container with the exterior thereof; and air passage bodies that shield said air passage in a plurality of stages, by disposing a plurality of moisture permeable, penetrated microscopic holes, inside said cylindrical body in such a manner that said air passage is shielded in a plurality of stages.

* * * * *